US010204350B2

(12) United States Patent
Patel et al.

(10) Patent No.: US 10,204,350 B2
(45) Date of Patent: Feb. 12, 2019

(54) VOUCHER PROCESSING SYSTEM

(75) Inventors: Vishrut Patel, Roswell, GA (US);
Derek Beveridge, Cumming, GA (US);
Thomas Pfeffer, Ball Ground, GA (US)

(73) Assignee: CHARTER SOLUTIONS INTERNATIONAL, Alpharetta, GA (US)

( * ) Notice: Subject to any disclaimer, the term of this patent is extended or adjusted under 35 U.S.C. 154(b) by 0 days.

(21) Appl. No.: 13/174,781

(22) Filed: Jul. 1, 2011

(65) Prior Publication Data

US 2011/0264504 A1      Oct. 27, 2011

(51) Int. Cl.
*G06Q 30/00* (2012.01)
*G06Q 30/02* (2012.01)

(52) U.S. Cl.
CPC ......... *G06Q 30/02* (2013.01); *G06Q 30/0235* (2013.01)

(58) Field of Classification Search
USPC ...................................... 705/14.35
See application file for complete search history.

(56) References Cited

U.S. PATENT DOCUMENTS

| 6,424,949 | B1 * | 7/2002 | Deaton | G06Q 20/387 |
| | | | | 705/14.25 |
| 7,904,334 | B2 | 3/2011 | Chen | |
| 8,583,564 | B2 * | 11/2013 | Wiseman | G06Q 30/04 |
| | | | | 705/14.1 |
| 2002/0165771 | A1 * | 11/2002 | Walker et al. | 705/14 |
| 2003/0092477 | A1 * | 5/2003 | Luciano, Jr. | B26F 3/002 |
| | | | | 463/16 |
| 2004/0215517 | A1 * | 10/2004 | Chen | G06Q 10/02 |
| | | | | 705/14.35 |

(Continued)

FOREIGN PATENT DOCUMENTS

JP       2002049790 A      2/2002

OTHER PUBLICATIONS

Komi Restaurant Home Page, www.komirestaurant.com, Apr. 30, 2011, Retrieved via Wayback Machine: http://web.archive.org/web/20110430173022/http://komirestaurant.com.*

(Continued)

*Primary Examiner* — Matthew T Sittner
(74) *Attorney, Agent, or Firm* — Johnson, Marcou & Isaacs, LLC

(57) ABSTRACT

Computer systems for facilitating the sale and distribution of vouchers (e.g., restaurant vouchers) that may, for example, only be redeemable during a particular time window on a particular day. The system may display fixed prices for vouchers or allow consumers to bid on day and/or time-specific vouchers having a particular value. The system may sell the same day and/or time-specific voucher at different prices and set the price of the voucher based on, for example: (1) purchaser/bidder status; (2) the number of the vouchers that have already been sold; or (3) a substantially random methodology. The restaurant may set fixed criteria that must be satisfied before the system will award a bidding consumer a particular voucher. In other embodiments, in cases where a particular bid does not satisfy a pre-determined set of minimum bid criteria, the system may facilitate direct negotiations between the bidding consumer and the restaurant.

8 Claims, 17 Drawing Sheets

(56) References Cited

U.S. PATENT DOCUMENTS

| | | | |
|---|---|---|---|
| 2006/0089878 A1* | 4/2006 | Roberts | G06Q 30/02 705/14.1 |
| 2007/0118443 A1 | 5/2007 | Haque | |
| 2007/0185794 A1 | 8/2007 | Keiser | |
| 2009/0063351 A1* | 3/2009 | Schmeyer | G06Q 10/02 705/64 |
| 2009/0076926 A1* | 3/2009 | Zinberg | G06Q 30/0601 705/26.1 |
| 2009/0150211 A1* | 6/2009 | Bayne | G06Q 30/00 705/14.17 |
| 2009/0204500 A1* | 8/2009 | Shpun | G06Q 30/00 705/14.25 |
| 2009/0216637 A1* | 8/2009 | Bayne | G06Q 20/08 705/14.17 |
| 2010/0042502 A1* | 2/2010 | Farmanfarmaian et al. | 705/14.58 |
| 2011/0207430 A1* | 8/2011 | Diaz Barroso | G06Q 30/02 455/406 |
| 2011/0213674 A2* | 9/2011 | Shpun | G06Q 30/00 705/26.4 |
| 2011/0231321 A1* | 9/2011 | Milne | 705/80 |
| 2011/0270667 A1* | 11/2011 | Kenny | G06O 30/00 705/14.36 |
| 2011/0313840 A1* | 12/2011 | Mason | G06Q 30/02 705/14.35 |
| 2012/0036024 A1* | 2/2012 | Mysen | G06Q 30/02 705/14.71 |
| 2012/0265598 A1* | 10/2012 | Krone | 705/14.35 |
| 2012/0265671 A1* | 10/2012 | Higgins | G06F 21/335 705/39 |
| 2012/0284100 A1* | 11/2012 | Goldberg | 705/14.19 |
| 2013/0060641 A1* | 3/2013 | Al Gharabally | H04H 60/63 705/14.66 |
| 2013/0080239 A1* | 3/2013 | Okerlund | G06Q 30/0226 705/14.33 |

OTHER PUBLICATIONS

Nickitas-Etenne, "International Preliminary Report on Patentability issued in International Application No. PCT/US2012/045146,", dated Jan. 7, 2014, 1-5.

Park, "International Search Report and Written Opinion issued in International Application No. PCT/US2012/045146,", dated Jan. 25, 2013, 1-7.

\* cited by examiner

Vouchers Available

| Voucher | | Price | Place |
|---|---|---|---|
| $ 33 | for | $ 13 | Restaurant 0 |
| $ 44 | for | $ 20 | Restaurant 1 |
| $ 56 | for | $ 11 | Restaurant 2 |
| $ 52 | for | $ 11 | Restaurant 3 |
| $ 51 | for | $ 14 | Restaurant 4 |
| $ 58 | for | $ 23 | Restaurant 5 |
| $ 33 | for | $ 10 | Restaurant 6 |
| $ 30 | for | $ 11 | Restaurant 7 |
| $ 43 | for | $ 13 | Restaurant 8 |
| $ 54 | for | $ 19 | Restaurant 9 |

FIG. 5

Pending Vouchers

Waiting for approval

| Voucher | | Price | Place |
|---|---|---|---|
| $ 50 | for | $ 20 | Restaurant 15 |
| $ 35 | for | $ 15 | Restaurant 47 |

Approved waiting for purchase

| Voucher | | Price | Place |
|---|---|---|---|
| $ 40 | for | $ 20 | Restaurant 215 |

Not approved

| Voucher | | Price | Place |
|---|---|---|---|
| $ 40 | for | $ 20 | Restaurant 123 |

FIG. 16

VOUCHER PROCESSING SYSTEM

BACKGROUND

Restaurants, and other businesses, constantly seek improved ways of generating new business, increasing the quality of their services, and reducing overhead. Voucher processing systems according to various embodiments may be used to address these needs.

SUMMARY OF VARIOUS EMBODIMENTS

A voucher distribution computer system according to various embodiments comprises at least one computer processor and memory, and is configured for: (1) receiving, from a restaurant, a first set of offer criteria that a consumer's offer must satisfy in order to be deemed adequate compensation for a first restaurant voucher, the first restaurant voucher being redeemable for a predetermined amount of goods or services on a first particular day; (2) receiving, from the restaurant, a second set of offer criteria that a consumer's offer must satisfy in order to be deemed adequate compensation for a second restaurant voucher, the second restaurant voucher being redeemable for a predetermined amount of goods or services on a second particular day; (3) receiving, from a first user, a first bid on the first restaurant voucher; (4) determining whether the first bid satisfies the first set of offer criteria; (5) at least partially in response to determining that the first bid satisfies the first set of offer criteria, facilitating a transfer of the first restaurant voucher to the first user; (6) receiving, from a second user, a second bid on the second restaurant voucher; (7) determining whether the second bid satisfies the second set of offer criteria; and (8) at least partially in response to determining that the second bid satisfies the second set of offer criteria, facilitating a transfer of the second restaurant voucher to the second user.

In particular embodiments, a suitable voucher distribution computer system comprises at least one computer processor and memory, and is configured for: (1) receiving, from a restaurant, a first set of offer criteria that a consumer's bid must satisfy in order to be deemed adequate compensation for any one of a particular set of restaurant vouchers, each of the particular set of restaurant vouchers being redeemable at the restaurant for a predetermined amount of goods or services on a particular day; (2) receiving, from the restaurant, a second set of offer criteria that a consumer's bid must satisfy in order to be deemed adequate compensation for any one of the particular set of restaurant vouchers; (3) receiving a particular bid from a user to purchase one of the particular set of restaurant vouchers; (4) determining, based on a status of the user, whether to apply the first set of offer criteria or the second set of offer criteria in determining whether the particular bid is adequate compensation for one of the particular set of restaurant vouchers; (5) in response to determining to apply the first set of offer criteria in determining whether the particular bid is adequate compensation one of the particular set of restaurant vouchers, determining whether the particular bid satisfies the first set of offer criteria; (6) at least partially in response to determining that the particular bid satisfies the first set of offer criteria, facilitating a transfer of one of the first set of restaurant vouchers to the user; (7) in response to determining to apply the second set of offer criteria in determining whether the particular bid is adequate compensation for one of the particular set of restaurant vouchers, determining whether the particular bid satisfies the second set of offer criteria; and (8) at least partially in response to determining that the particular bid satisfies the second set of offer criteria, facilitating a transfer of one of the second set of restaurant vouchers to the user.

A voucher distribution computer system according to yet another embodiment comprises at least one computer processor and memory, wherein the voucher distribution computer system is configured for: (1) receiving, from a restaurant, authorization to sell a particular number of restaurant vouchers at a first price, each of the restaurant vouchers being redeemable at the restaurant for the predetermined amount of goods or services on a particular day; (2) receiving, from the restaurant, authorization to sell a particular number of restaurant vouchers at a second price, each of the restaurant vouchers being redeemable at the restaurant for the predetermined amount of goods or services on a particular day; (3) determining whether to offer to sell at least one of the restaurant vouchers to a particular user at the first or the second price; (4) in response to determining to offer to sell the at least one of the restaurant vouchers to the particular user at the first price, offering to sell the at least one of the restaurant vouchers to the particular user at the first price; and (5) in response to determining to offer to sell the at least one of the restaurant vouchers to the particular user at the second price, offering to sell the at least one of the restaurant vouchers to the particular user at the second price.

BRIEF DESCRIPTION OF THE DRAWINGS

Figure 1:
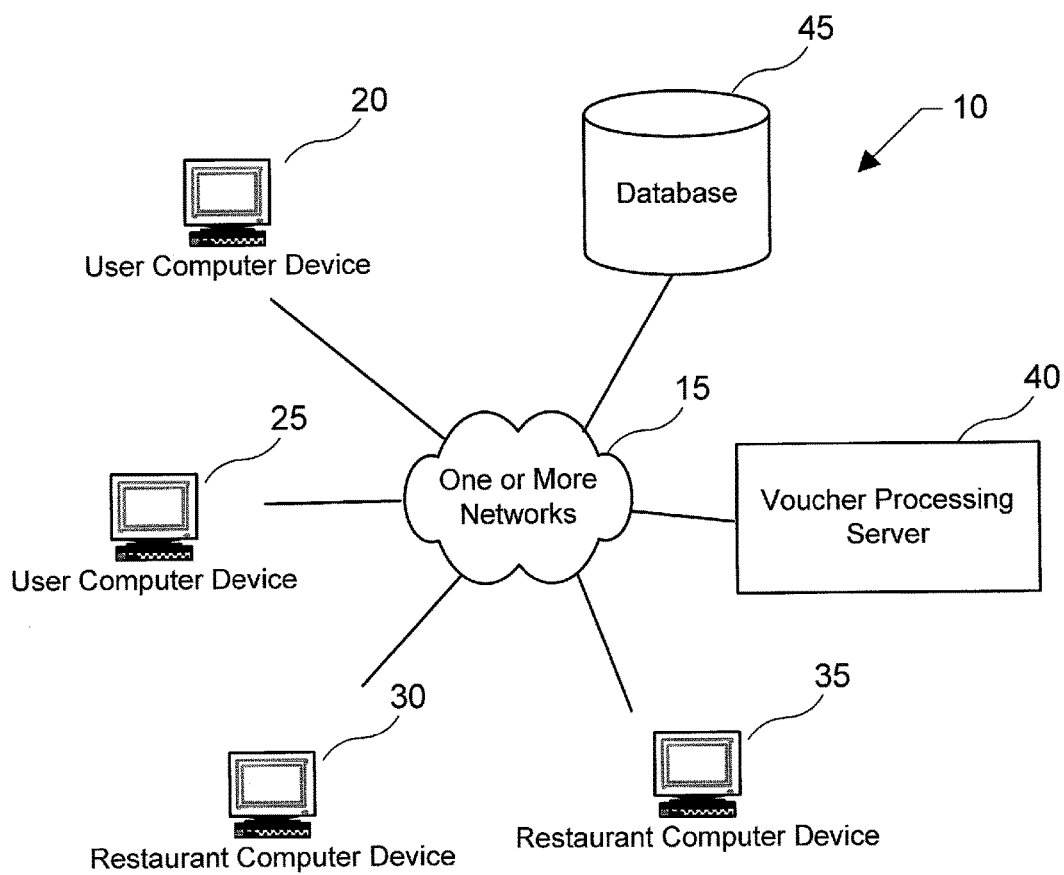

Having thus described various embodiments in general terms, reference will now be made to the accompanying drawings, which are not necessarily drawn to scale, and wherein:

FIG. 1 is a block diagram of a voucher processing system according to one embodiment.

Figure 2:
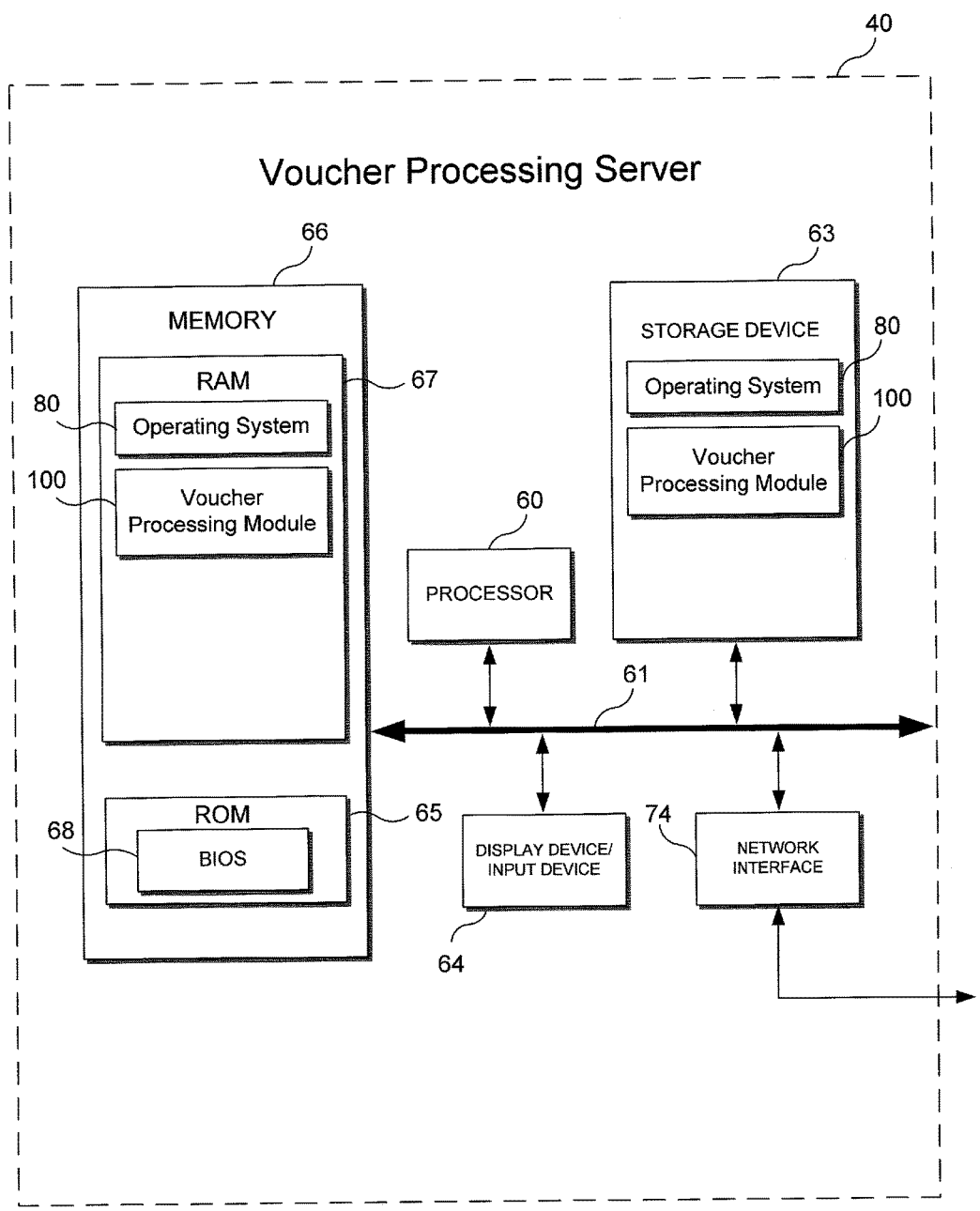

FIG. 2 is a block diagram of the voucher processing server of FIG. 1.

Figure 3:
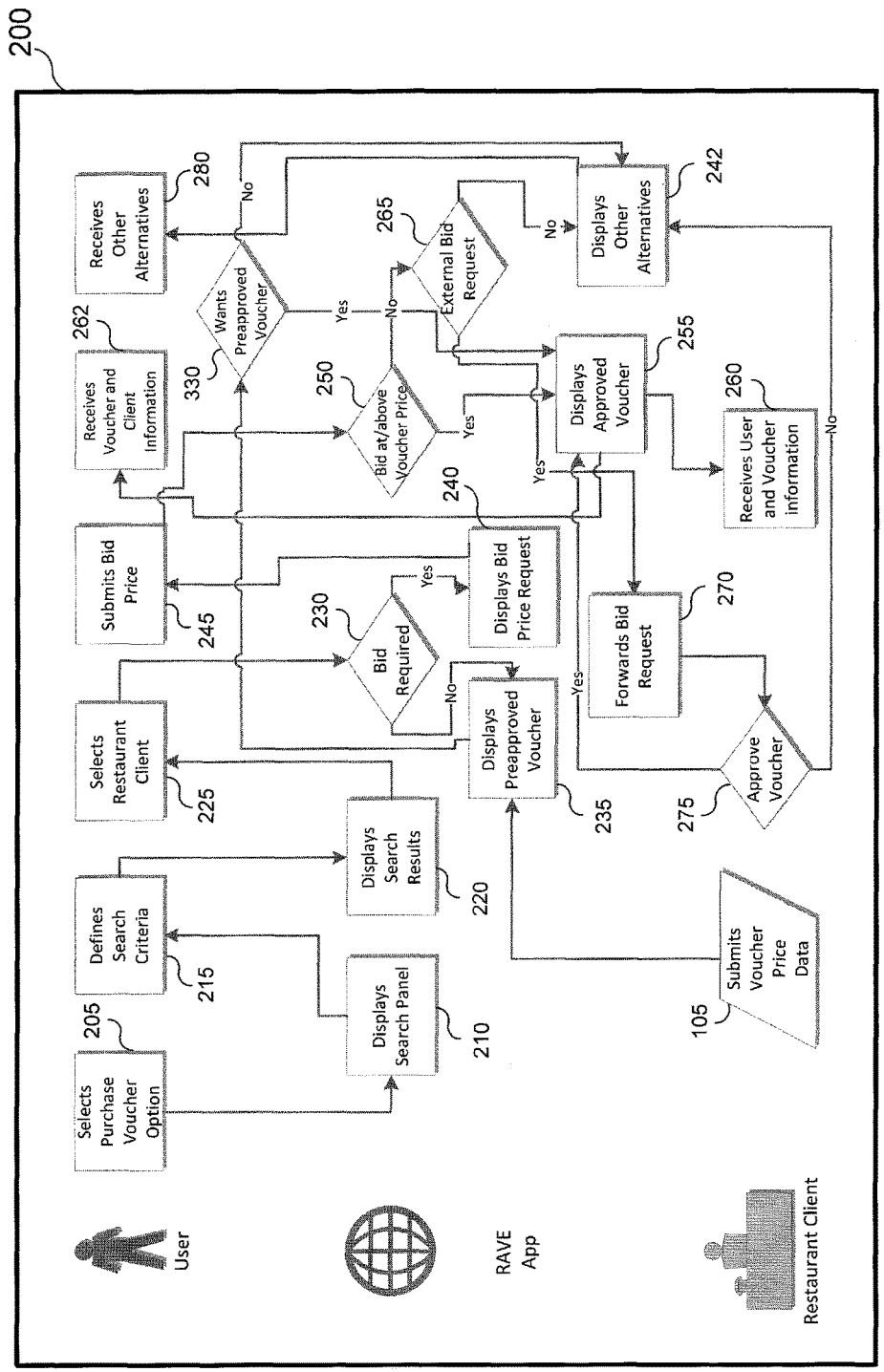

FIG. 3 is a flowchart showing the operation of a voucher processing system according to a particular embodiment.

Figure 4:
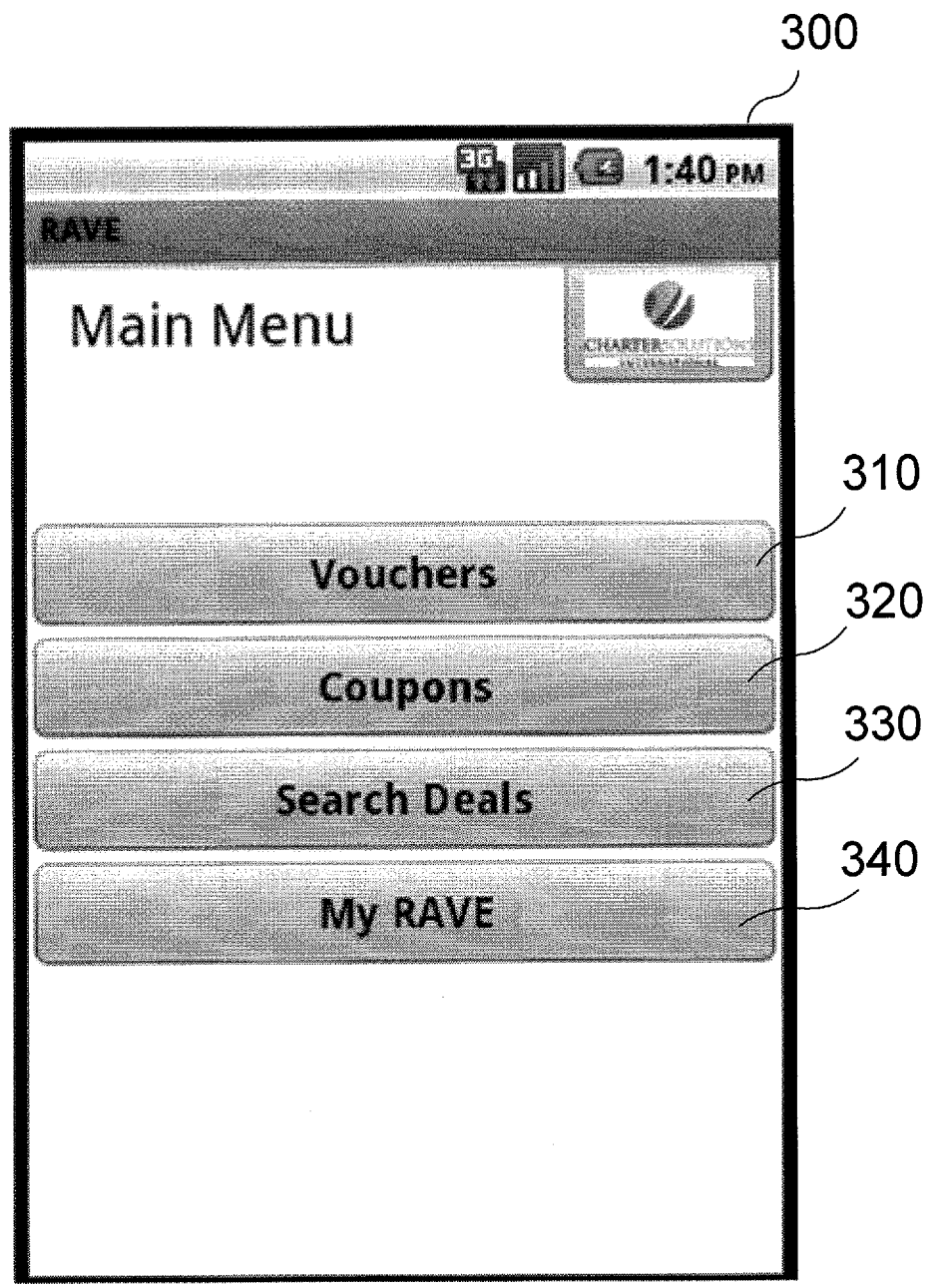

FIG. 4 is a screen shot of a Main Menu user interface screen according to a particular embodiment.

FIG. 5 is a screen shot of a Vouchers Available user interface screen according to a particular embodiment.

Figure 6:
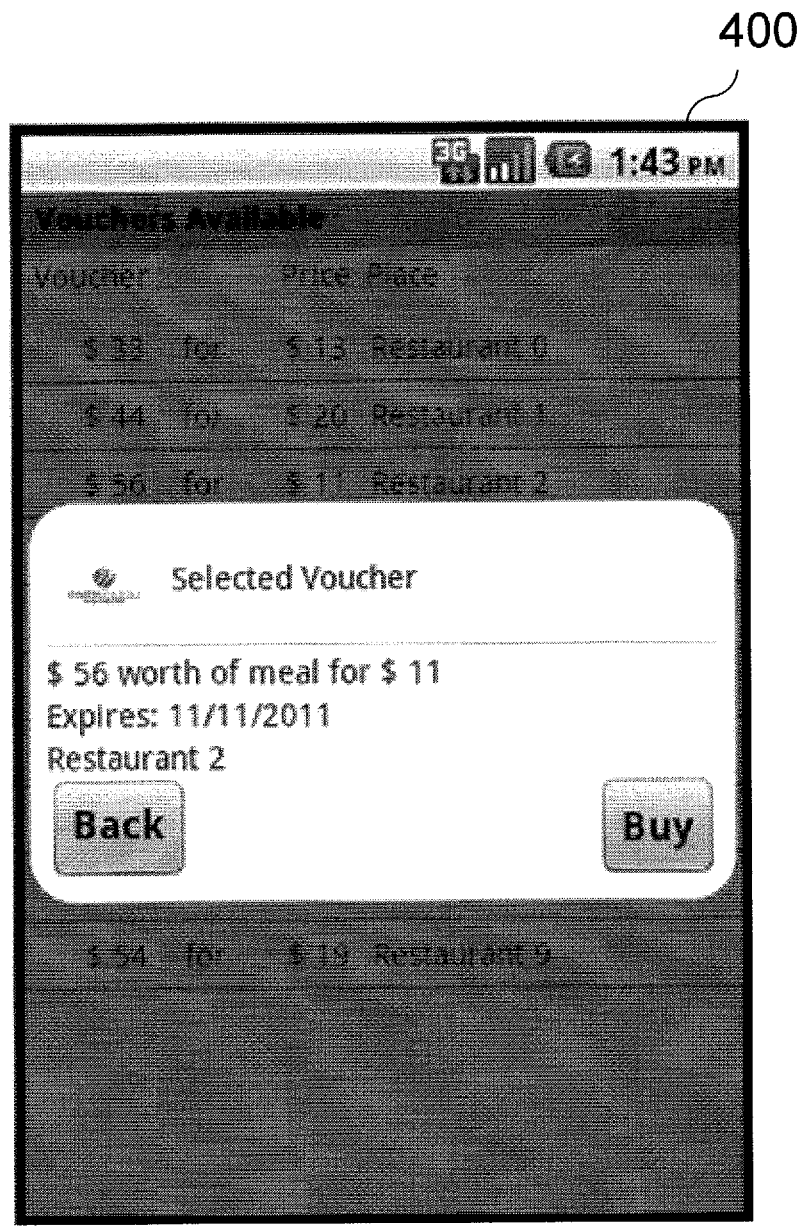

FIG. 6 shows a Selected Voucher screen display according to a particular embodiment.

Figure 7:
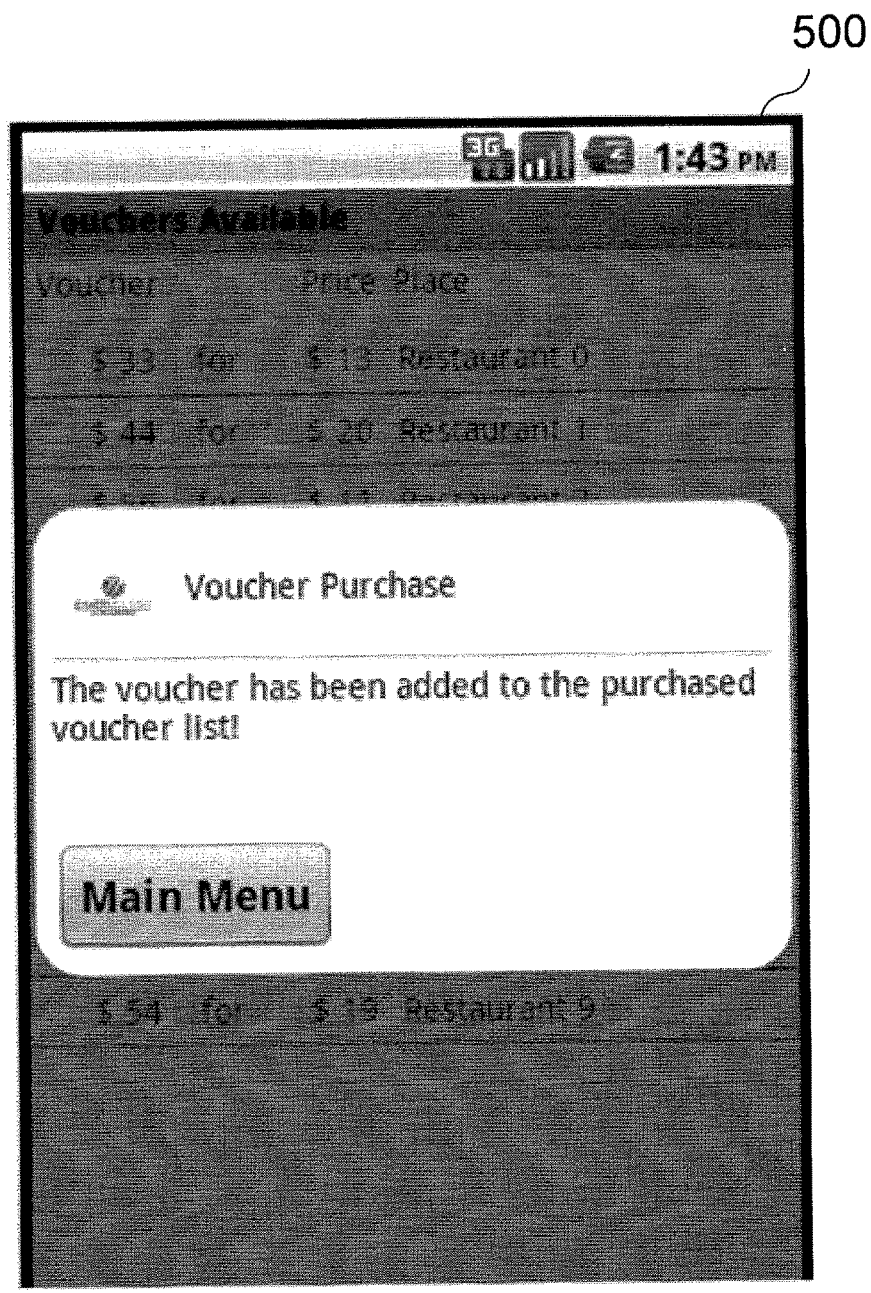

FIG. 7 shows a Voucher Purchase screen display according to a particular embodiment.

Figure 8:
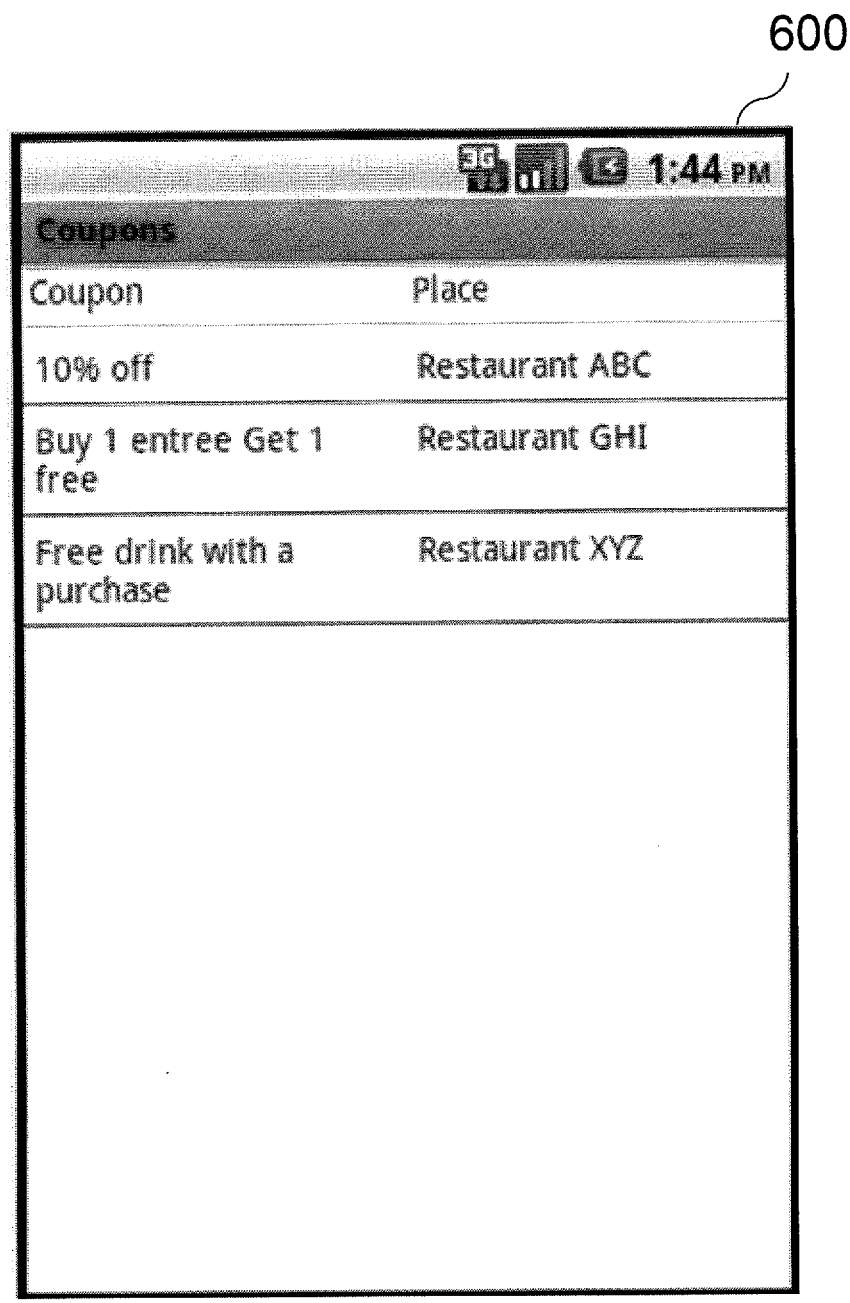

FIG. 8 is a screen shot of an Available Coupons user interface screen according to a particular embodiment.

Figure 9:
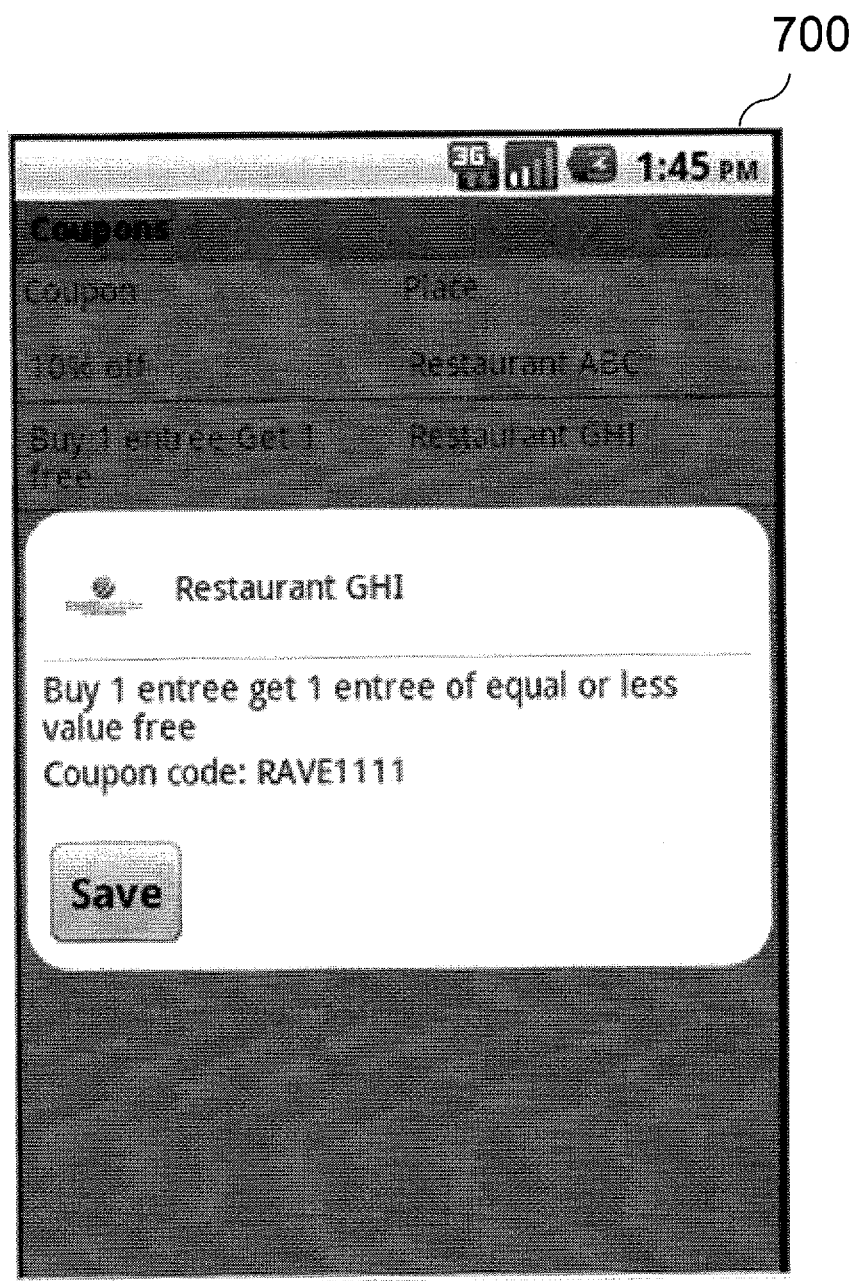

FIG. 9 is a screen display that shows an example of a coupon according to a particular embodiment.

Figure 10:
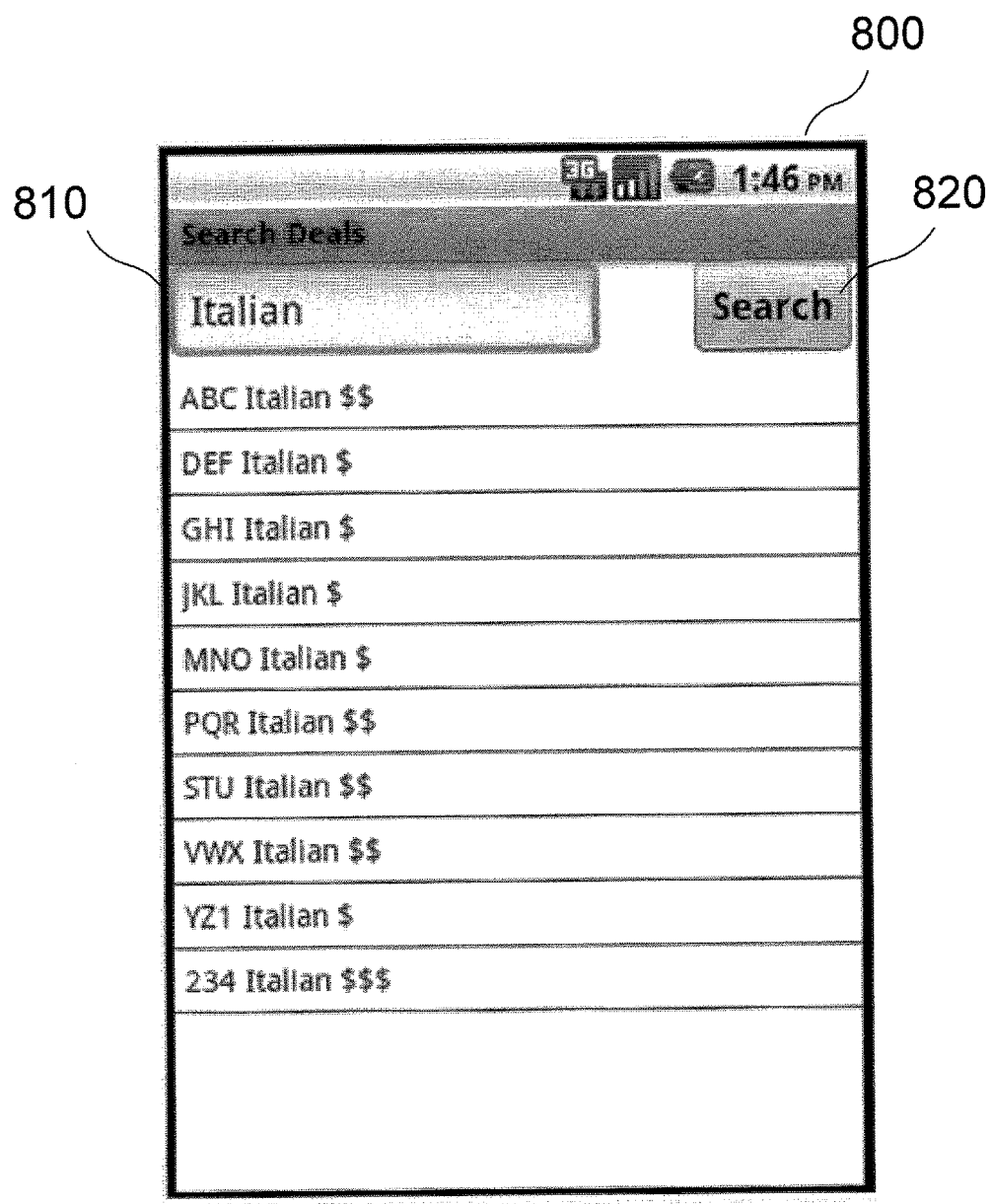

FIG. 10 is a Search Deals screen display according to a particular embodiment.

Figure 11:
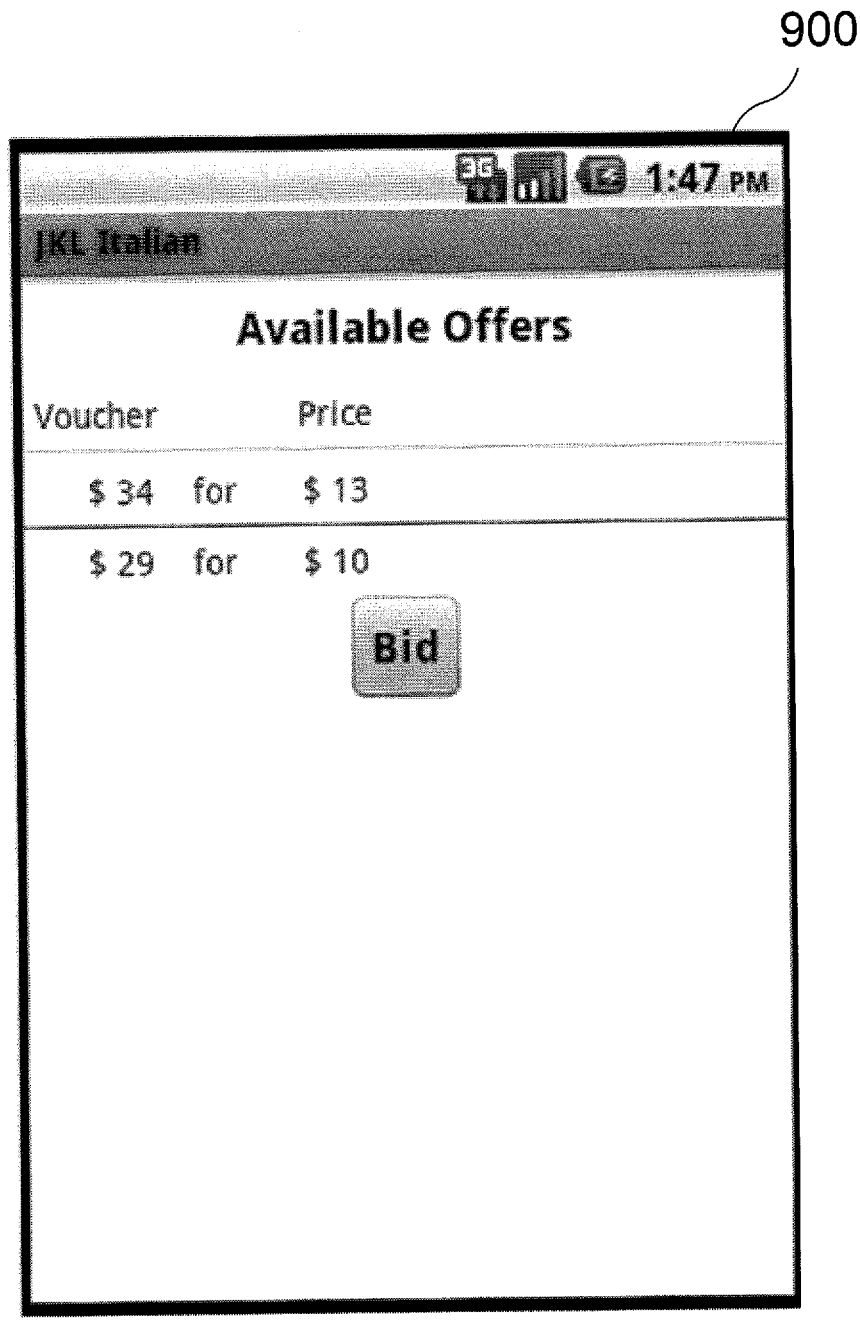

FIG. 11 is an Available Offers screen display according to a particular embodiment.

Figure 12:
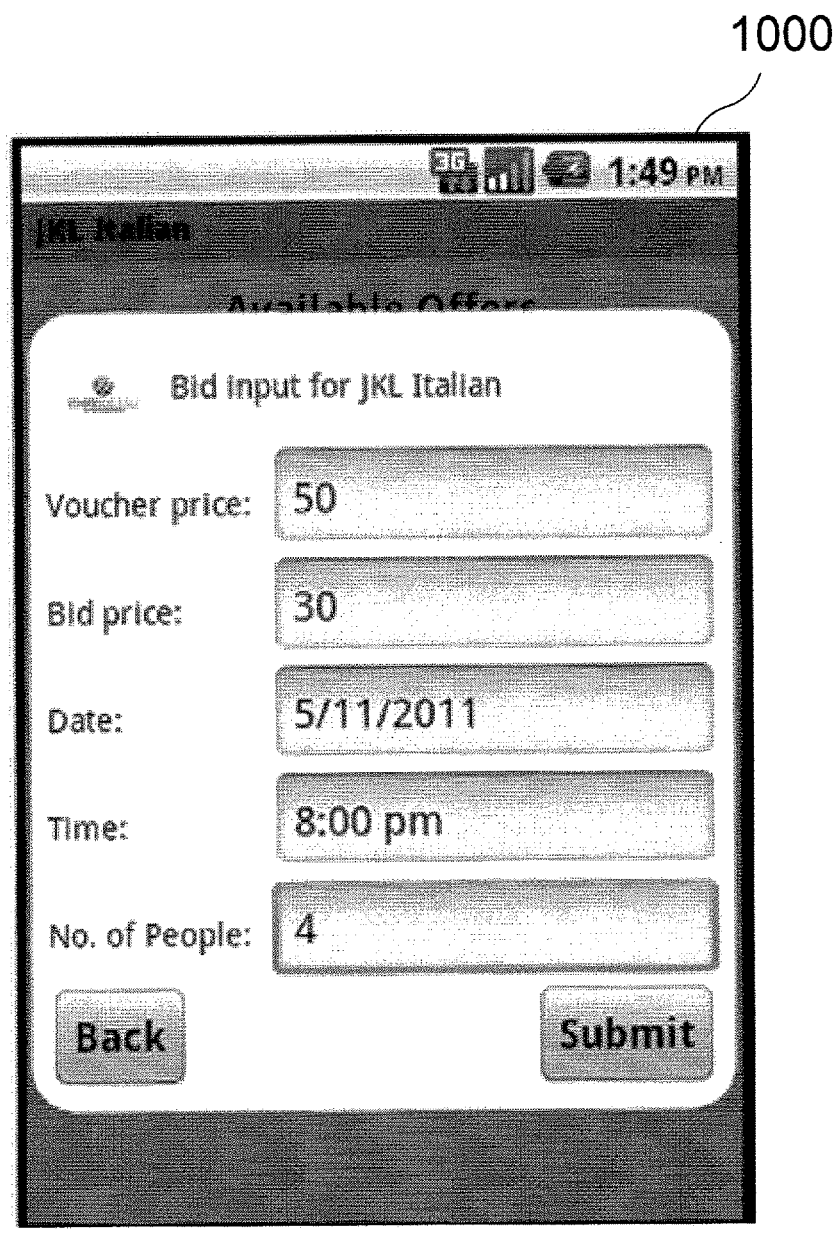

FIG. 12 is a Bid Input screen display according to a particular embodiment.

Figure 13:
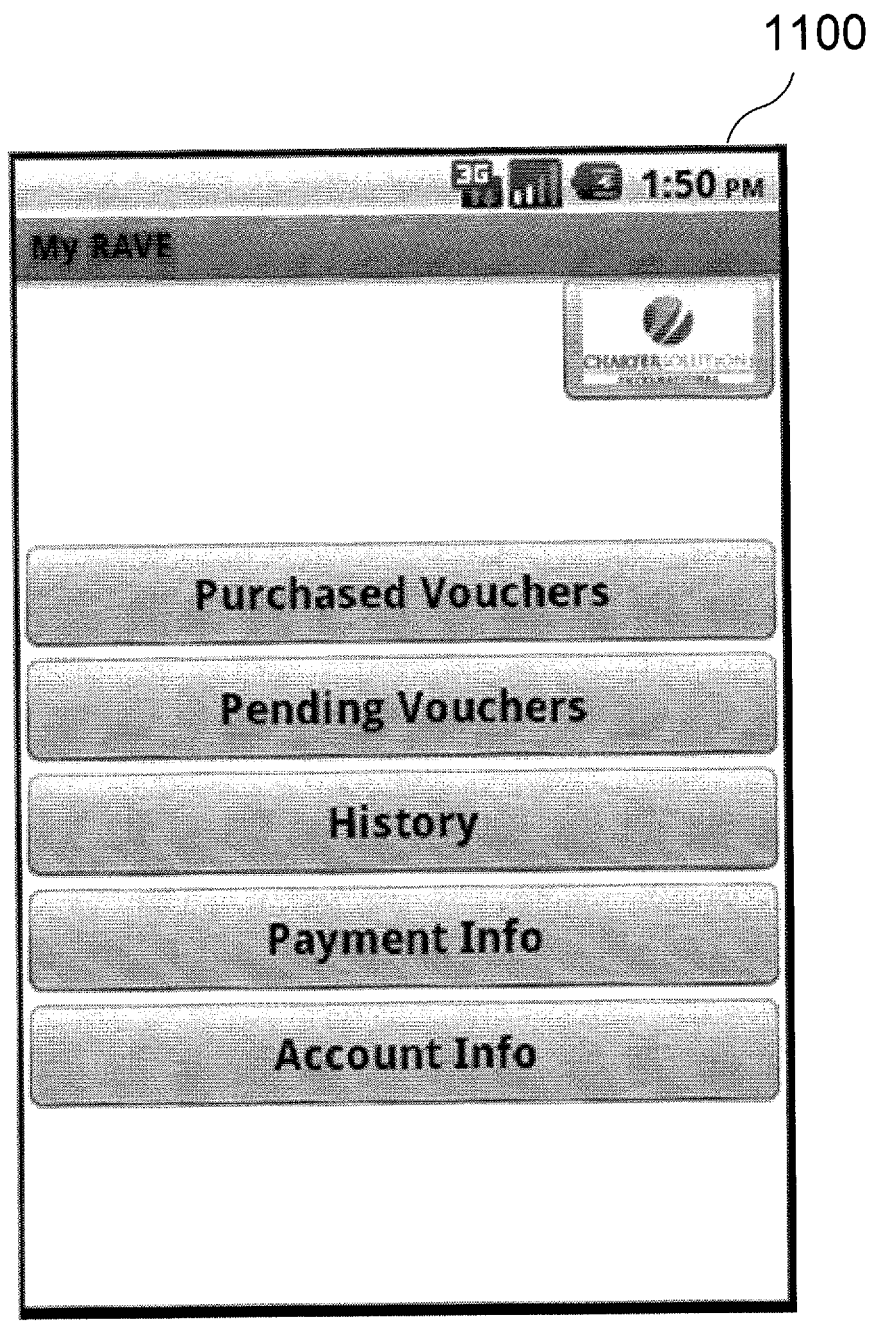

FIG. 13 is a screen shot of a User Account screen according to a particular embodiment.

Figure 14:

FIG. 14 is a screen shot of a Purchased Vouchers/Saved Coupons screen according to a particular embodiment.

Figure 15:

FIG. 15 is a screen display that shows a purchased voucher according to a particular embodiment.

FIG. 16 is an exemplary screen display that shows vouchers in various states of approval.

Figure 17:
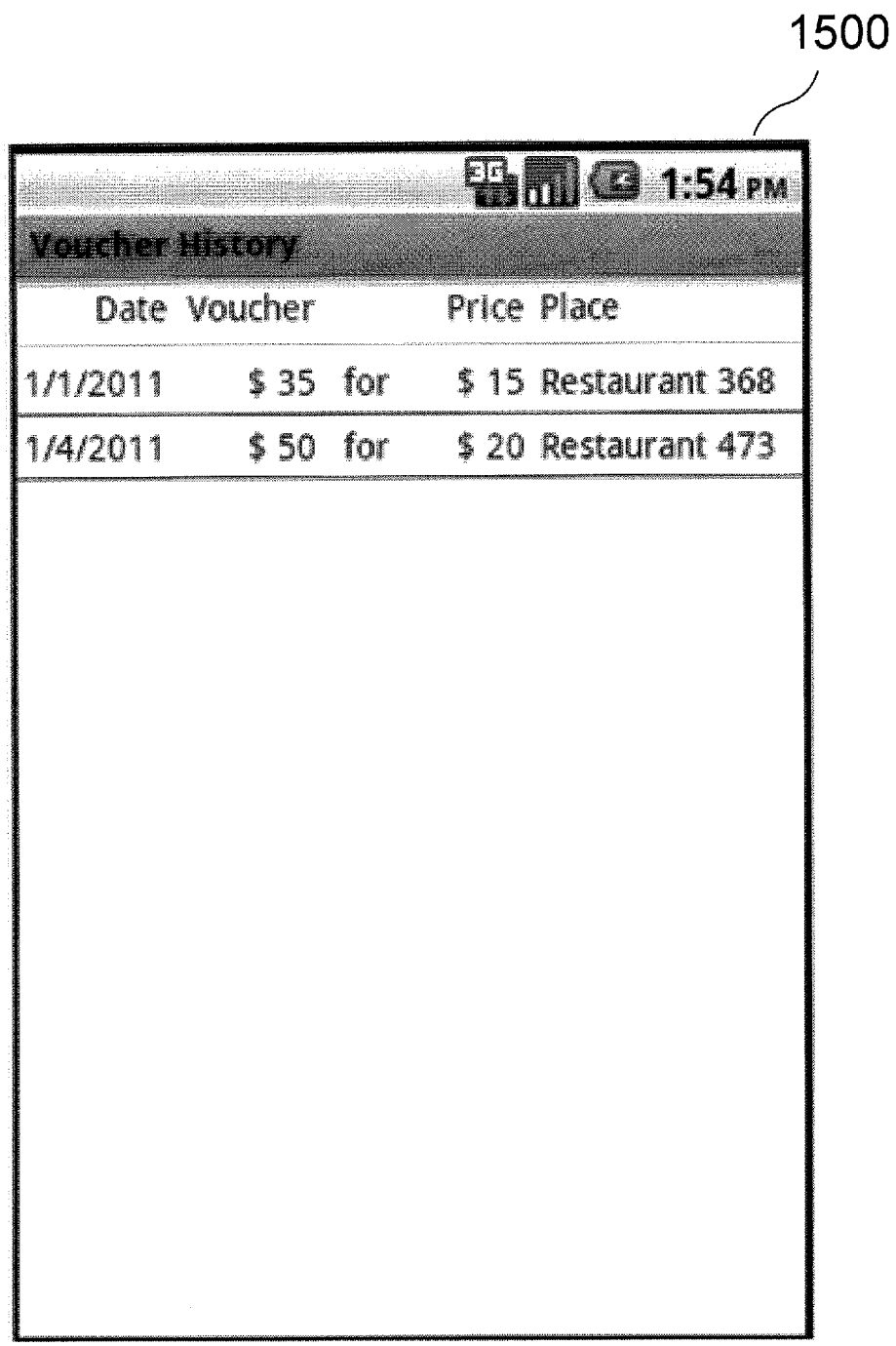

FIG. 17 is a screen display that shows a user's voucher history according to a particular embodiment.

DETAILED DESCRIPTION OF VARIOUS EMBODIMENTS

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the relevant field. Like numbers refer to like elements throughout.

Overview

Computer systems according to various embodiments are adapted to facilitate the sale and distribution of restaurant vouchers (or other types of vouchers) that, for example, may only be redeemable during a particular time window on a particular day. The restaurant may tailor the price of the vouchers according to any suitable criteria, but may, for example, tailor the pricing of their vouchers to increase business during times when business is particularly light. For example, if business is typically slow on Wednesdays during the traditional lunch period (e.g., between 11:00 am and 2:00 pm), the restaurant may offer food vouchers for sale at a discount to increase business during this time period. For busier time periods (e.g., Fridays during traditional dinner hours), the restaurant may choose to offer only slightly discounted food vouchers, or to not offer discounted vouchers at all.

In particular embodiments, the system may be configured to display fixed prices for vouchers (e.g., the system may display a fixed price of $20 for a voucher that is good for $25 in food/drinks at a particular restaurant). Alternatively, the system may allow consumers to bid on day and/or time-specific vouchers having a particular value. In such embodiments, the restaurant may specify bidding criteria (e.g., a minimum acceptable bid) that they would accept for the vouchers and the system will coordinate the sale of vouchers to consumers whose bids satisfy the specified bidding criteria for the vouchers at issue.

In some embodiments, the system may, with the permission of the restaurant, sell the same day and/or time-specific voucher at different prices. The system may set the price of the voucher based on, for example: (1) the status of the individual purchasing, or bidding on, the voucher; (2) the number of the vouchers that have already been sold; or (3) a substantially random methodology.

In some embodiments, the restaurant may set fixed criteria that must be satisfied before the system will award a bidding consumer a particular voucher. In other embodiments, in cases where a particular bid does not satisfy a pre-determined set of minimum bid criteria, the system may facilitate direct negotiations between the bidding consumer and the restaurant.

In further embodiments, the system may facilitate a true reverse auction between a consumer wishing to purchase a voucher meeting certain criteria and a plurality of participating restaurants.

The details of various embodiments of the voucher processing system are discussed in greater detail below.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 shows a block diagram of a Voucher Processing System 10 according to a preferred embodiment. As may be understood from this figure, the Voucher Processing System 10 includes a Voucher Processing Server 40, one or more computer networks 15, a Database 45, a first User Computer Device 20, a second User Computer Device 25, a first Restaurant Computer Device 30, and a second Restaurant Computer Device 35. The one or more computer networks 15 facilitate communication between the User Computer Devices 20, 25, the Restaurant Computer Devices 30, 35, the Database 45, and the Voucher Processing Server 40. These one or more computer networks 15 may include any of a variety of types of computer networks such as the Internet, a private intranet, a public switch telephone network (PSTN), or any other type of network known in the art. In certain variations of the embodiment shown in FIG. 1, both the communication link between the Voucher Processing Server 40 and both the User Computer Devices 20, 25 and the Restaurant Computer Devices 30, 35 are implemented via the Internet using Internet protocol (IP). In certain embodiments, the communication link between the Voucher Processing Server 40 and the Database 45 may be, for example, implemented via a Local Area Network (LAN).

FIG. 2 is a block diagram of an exemplary embodiment of the Voucher Processing Server 40 of FIG. 1. The Voucher Processing Server 40 includes a processor 60 that communicates with other elements within the Voucher Processing Server 40 via a system interface or bus 61. Also included in the Voucher Processing Server 40 is a display device/input device 64 for receiving and displaying data. This display device/input device 64 may be, for example, a keyboard, voice recognition, or pointing device that is used in combination with a monitor. The Voucher Processing Server 40 further includes memory 66, which preferably includes both read only memory (ROM) 65 and random access memory (RAM) 67. The server's ROM 65 is used to store a basic input/output system 68 (BIOS) that contains the basic routines that help to transfer information between elements within the Voucher Processing Server 40.

In addition, the Voucher Processing Server 40 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for the Voucher Processing Server 40. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, and a Voucher Processing Module 100. The Voucher Processing Module 100 controls certain aspects of the operation of the Voucher Processing Server 40, as is described in more detail below, with the assistance of the processor 60 and an operating system 80.

Also located within the Voucher Processing Server 40 is a network interface 74 for interfacing and communicating with other elements of a computer network. It will be appreciated by one of ordinary skill in the art that one or more of the Voucher Processing Server 40 components may be located geographically remotely from other Voucher Processing Server 40 components. Furthermore, one or more of the components may be combined, and additional components performing functions described herein may be included in the Voucher Processing Server 40.

Exemplary System Modules

As noted above, various aspects of the Voucher Processing Server's functionality may be executed by the system's Voucher Processing Module 100. The operation of this module may be generally understood from FIG. 3, which illustrates an example of the operation of a Voucher Processing Server 40 running a Voucher Processing Module 100 according to a particular embodiment. In this figure: (1) Steps 205, 215, 225, 245, 262, and 280 are executed by a user (e.g., a consumer); (2) Steps 105, 275, and 260 are executed by a restaurant client; and (3) the remaining steps are executed by a Voucher Processing Server 40 executing a Voucher Processing Module 100.

Turning to FIG. 3, the process begins at Step 105, where a restaurant representative first indicates (e.g., via a restaurant computer device 30, 35 or other suitable computing device) whether they wish to operate as (1) a static client (in which case the restaurant will initially define set terms according to which they will accept vouchers, and then have the Voucher Processing System 10 make the final decision as to how to distribute the vouchers); or (2) a dynamic client (in which case the restaurant defines an initial set of terms according to which they will accept vouchers and have the Voucher Processing System 10 distribute vouchers according to those terms; in cases where a consumer's bid does not satisfy the restaurant's initial set of terms, the restaurant will also have the option of either accepting the lower offer or negotiating the terms of the voucher purchase via an on-line negotiation process.)

Next, still at Step 105, the restaurant representative submits (e.g., via a restaurant computer device 30, 35 or other suitable computing device) a list of vouchers that the restaurant will accept at certain prices for certain days/meals. The restaurant representative may also specify a specific number of vouchers (e.g., for a certain amount of purchases) that they are willing to accept for a particular time period and/or at a given price. For example, the restaurant representative may indicate that the restaurant would be willing to accept, for May 11, 2011 from 6:00 pm-9:00 pm:

20 vouchers for $50 worth of food that may be purchased for $25/each 25 vouchers for $50 worth of food that may be purchased for $30/each The Voucher Processing System 10 then saves the inputted restaurant information to memory (e.g., to a suitable database 45), and prepares to make the vouchers available for purchase by consumers.

To begin the voucher purchase process, a consumer begins at Step 205, where they log into the Voucher Processing System 10 (e.g., using a suitable User Computer Device 25, 30, such as their smartphone, tablet computer, or laptop). The system then displays a main menu screen 300 (see FIG. 4), where the consumer may: (1) use a Vouchers button 310 to view and purchase vouchers; (2) use a Coupons button 320 to view available coupons; (3) use a Search Deals button 330 to search for vouchers or other deals; and (4) use a User Account button 340 to view information related to their account.

In particular embodiments, if the consumer selects the Vouchers button 310, a Vouchers Available screen 300 is displayed (see FIG. 5) showing the various vouchers that are currently available at various restaurants (in this example, Restaurants 0-9). The consumer may then use this screen, and a suitable Selected Voucher Display 400 (see FIG. 6) to purchase vouchers for the prices displayed on the screen. After the voucher is purchased, the system confirms the purchase via a suitable Voucher Purchase confirmation display 500 (see FIG. 7).

In particular embodiments, if the consumer selects the Coupons button 320 on the main menu screen 300 (See FIG. 4), a Coupons screen 600 is displayed (see FIG. 8) showing the various coupons that are currently available at various restaurants. If a consumer wishes to use one of the Coupons, the consumer simply selects the coupon that the consumer wishes to use. The system then displays the Coupon code for the coupon on a suitable coupon display 700 (see FIG. 9).

Returning to FIGS. 3 and 4, if the consumer selects the "Search Deals" button 330 on the Main Menu screen 300, the system advances to Step 210, where it displays a "Search Deals" screen 800 (see FIG. 10). At Step 215, the consumer then defines their desired search criteria by entering the criteria into a search box 810 on the Search Deals screen 800, and then runs the search by selecting a Search key 820.

At Step 220, the system then displays the search results as shown in FIG. 10. At Step 225, the consumer then selects the desired restaurant and the system may, for example: (1) display a set, pre-priced, listing of vouchers that the selected restaurant is offering; (2) display a set, pre-priced, listing of vouchers that the selected restaurant is offering, and also give the consumer an opportunity to bid on any of the displayed vouchers; or (3) display a listing of vouchers that the restaurant is offering and give the consumer the option to bid on the vouchers. FIG. 11 shows a screen that provides the consumer with the option of purchasing from a list of pre-priced vouchers that the selected restaurant is offering, or to bid on any of the displayed vouchers.

Turning again to FIG. 3, in a particular embodiment, in response to the consumer selecting a particular restaurant from the list displayed on the Search Deals Screen 800 of FIG. 10, at Step 230, the system determines whether the system will display only pre-priced vouchers, or whether the consumer must bid on the vouchers. If the system determines that no bid is required (or allowed), the system advances to Step 235 where it displays a list of pre-priced vouchers for the restaurant. The system then advances to Step 330 where it determines whether the consumer wishes to purchase any of the displayed vouchers. If so, the system coordinates the sale of the voucher to the consumer (e.g., via a suitable invoicing or electronic payment process). Finally, the system displays information regarding the voucher at Step 255, and then, at Step 260, forwards information regarding the voucher and the consumer who purchased the voucher to the Restaurant (e.g., via an e-mail to a suitable Restaurant Computer Device 30, 35, or any other suitable electronic or paper message). The restaurant may then use this information to help estimate how busy they will be during the time window for which the voucher is valid. The restaurant may also use the consumer information to customize the restaurant to suit the consumer's preferences (which may be determined from information stored in the system's databases.)

Returning to Step 230, if the system determines that a bid is required for vouchers offered by the restaurant, the system displays the vouchers that are available for bidding and advances to Step 240 where it displays a bid price entry screen. At Step 245, the consumer then enters their bid price into the system. At Step 250, the system then determines whether the consumer's bid satisfies bid criteria for the voucher that has been provided by the restaurant (e.g., the system may determine, for example, whether the bid is at or above a minimum voucher price specified by the Restaurant at Step 105). If so, the system advances to Step 255 where it coordinates payment for the voucher, displays a voucher purchase confirmation, and forwards the relevant consumer and voucher information to the restaurant as described above.

If, at Step 250, the system determines that the consumer's bid does not satisfy the specified criteria, the system advances to Step 265, where it determines whether to send the bid directly to the Restaurant for consideration (which the system would do if the Restaurant had specified, at Step 105, that it would like to be a dynamic client). If not, the system advances to Step 242 where it informs the consumer that their bid has been rejected and displays other alternatives to the consumer. For example, the system may provide the consumer with one or more opportunities to offer a higher bid, or the system may present the consumer with an opportunity to purchase, or bid on, similar vouchers. At Step 280, the consumer receives the other alternatives.

If, at Step 265, the system determines to send the bid directly to the Restaurant for consideration, the system advances to Step 270 where it forwards the bid request to the restaurant for consideration. The system may do this, for example, by sending an e-mail to a designated representative of the restaurant, or by displaying a message on a dedicated restaurant computer device 30, 35. In certain embodiments, if the restaurant representative approves the voucher at Step 275, the system advances to Step 255 where it coordinates payment for the voucher, displays a voucher purchase confirmation, and forwards the relevant consumer and voucher information to the restaurant as described above. If not, the system advances to Step 242 where it informs the consumer that their bid has been rejected and displays other alternatives to the consumer. For example, the system may provide the consumer with one or more opportunities to offer a higher bid, or the system may present the consumer with an opportunity to purchase, or bid on, similar vouchers. At Step 280, the consumer receives the other alternatives.

In other embodiments, if the Restaurant rejects the consumer's bid at Step 275, the system may allow the Restaurant to negotiate with the consumer by, for example, making a counteroffer for the voucher (or for another voucher) that the consumer may optionally accept as discussed above.

Also, in certain embodiments, the system may be adapted to facilitate reverse auctions between the consumer and a plurality of restaurants. For example, the system may be adapted to allow a consumer to use the system to submit a request for voucher offers from restaurants that satisfy certain criteria (e.g., that have been specified by the consumer). For example, the consumer may submit a request for a voucher that is good for $30 worth of purchases at a Chinese restaurant that is located within 5 miles of the consumer's house for use during standard dinner hours on Jun. 22, 2011.

The system would then forward this request to restaurants that: (1) are signed up as dynamic clients; and (2) satisfy (or at least substantially satisfy) the consumer's specified restaurant criteria. The restaurants may then communicate offers satisfying the consumer's request to the consumer through the system. The consumer may then optionally purchase any of the offered vouchers in the manner described above.

In particular embodiments, after the consumer uses the system to purchase one or more vouchers, the consumer may use various system display screens to review information regarding their purchased and pending vouchers, their system usage history, and their account and payment information. See FIGS. 13-17, which show exemplary display screens for these purposes.

Example

The operation of exemplary embodiments of the Voucher Processing Module 100 is perhaps best understood by reviewing a particular example. The following example describes the experience of: (1) a restaurant and its representatives; (2) the Voucher Processing System 10; and (3) the consumer. As discussed above, the restaurant can choose whether to be a: (1) a static client (in which case the restaurant will initially define set terms according to which they will accept vouchers, and then have the Voucher Processing System 10 make the final decision as to how to distribute the vouchers); or (2) a dynamic client (in which case the restaurant defines an initial set of terms according to which they will accept vouchers and have the Voucher Processing System 10 distribute vouchers according to those terms. In cases where a consumer's bid does not satisfy the restaurant's initial set of terms, the restaurant will also have the option of either accepting the lower offer or negotiating the terms of the voucher purchase via an on-line negotiation process.

The experiences of each party will differ depending on which option the restaurant chooses. The parties' respective experiences according to a particular example are described below.

A. Static Client Experience

The following example demonstrates various parties' experiences in an example in which the restaurant has chosen to be a static client.

Restaurant Representative Experience

George is a manager at MNO Italian, which is an Italian restaurant. George inputs into the Voucher Processing System 10, via a Restaurant Computer Device 30 (See FIG. 1), information regarding vouchers that MNO Italian will accept at certain prices for certain days/meals. For example, MNO Italian may be willing to accept the following vouchers for May 11, 2011 from 6:00 pm-9:00 pm:

20 vouchers for $50 worth of food that may be purchased for $25/each 25 vouchers for $50 worth of food that may be purchased for $30/each 30 vouchers for $50 worth of food that may be purchased for $35/each George may also specify other combinations of vouchers for different days/times. After George enters this data into the system, the system determines how to market and sell the vouchers to consumers.

As consumers purchase vouchers for the specified day/time, George receives the information in a suitable manner (for example, through a web site associated with the system) and may use this information to help predict the volume of business MNO Italian will receive for the day/time specified on the vouchers. George may then use this information to arrange for the appropriate restaurant staffing for the specified day/time. This may avoid having too many people on staff at a particular time (which can be wasteful), or too few people on staff (which can result in poor customer service and/or employee burnout).

After the vouchers are issued, consumers may use the vouchers during the time window on the day for which their voucher is effective. If the voucher is not used during this time window, it would typically expire, or the restaurant may choose to honor it on another day.

Voucher Processing System Experience

Turning to the experience of the Voucher Processing System 10, as described above, the Voucher Processing Server 40 receives the information that George, the restaurant representative, entered outlining vouchers that MNO Italian would accept for a particular day/time.

The system then determines the specific rules for marketing and selling the vouchers. Below are several different exemplary methods that the system may use to market and sell the vouchers.

Exemplary Method 1: Use the Vouchers as Part of a Featured Deal

If the system uses a MNO Italian voucher as part of a featured deal, the system would display information regarding the voucher and allow the consumer to purchase the vouchers for a displayed price, which would typically be displayed along with the information regarding the voucher. In certain embodiments, the system may provide a set time limit for purchasing the voucher so that, if the consumer does not purchase the voucher within a predetermined period of time (which may, for example, be less than about 8 hours, less than about 5 hours, and/or less than about 1 hour), the system withdraws the offer to that particular consumer.

In cases where the restaurant representative has specified multiple different acceptable prices for a particular voucher, the system may determine which price to offer in a given situation in any appropriate way. For example, the system may use any of the following methodologies in determining which price to set for the vouchers in a particular situation:

Assign Price By Customer Class. The system may determine how to price a particular voucher based on the class of consumer that will be receiving the voucher. For example, the system may set the following prices for MNO Italian's $50 vouchers: (1) $25 for consumers who fall into a first particular class of customers (e.g., VIP customers); and (2) $30 for consumers who fall into a second particular class of customers (e.g., new or occasional customers).

Random Determination of Price Assignments. The system may set pricing for vouchers in a random manner to increase interest in the vouchers. For example, the system may at least substantially randomly determine: (1) which customers will have the opportunity to purchase $50 vouchers for $25; and (2) which consumers will have the opportunity to purchase $50 vouchers for $30.

Offer Lowest Available Price. The system may, for example, offer the least expensive vouchers for sale until they sell out, and then proceed to sell the next least expensive set of vouchers, and so on. In this case, the system may offer the $50 vouchers for sale for $25 vouchers until 20 of the vouchers are sold, then offer the vouchers for sale for $30 until 25 of the vouchers are sold, and then finally offer the vouchers for sale for $35 until 30 of the vouchers are sold. (It should be understood that although, in this example, the order in which the various vouchers are sold is determined by the price of the vouchers, in other examples, the order in which the vouchers are sold may be based on any other suitable criteria.)

Exemplary Method 2: Offer Consumers an Opportunity to Bid on the Vouchers

In particular embodiments, the system may offer consumers an opportunity to bid on the vouchers as described above. In this example, consumers are asked to place a bid for MNO Italian vouchers that may be used on a particular day in a particular time window. If a consumer's bid is equal to, or greater than, the minimum acceptable price for the voucher, the voucher is offered to the consumer at the consumer's offered price. The minimum acceptable price of the voucher may, for example, be determined by the system using any of the techniques described above.

If the consumer's bid is less than the price established by the system, the system may reject the consumer's offer and give the consumer a chance to re-bid (up to a pre-determined number of times), or the system may reject the bid and provide no chance to re-bid. In either case, once the consumer reaches a point where they have no other bids available for MNO Italian, the system locks them out of bidding on vouchers from MNO Italian for a pre-determined time period (e.g., three days). The consumer may still bid on other restaurants during this time period.

If a voucher is ultimately sold to the consumer, the system issues the voucher (via a web site, email, physical mail, etc.) and updates its database to reflect that one less voucher of that type is available.

After the system sets up voucher distribution rules (which will serve to determine, at least in part, its interaction with consumers), the system interacts with consumers to allow them to identify and purchase vouchers as described in greater detail below.

Consumer Experience

Steven is a consumer who wants to find a deal for dinner at a restaurant near his home that is good for May 11. Steven logs into the voucher distribution system using a user computer device 20, 25 (e.g., his smartphone). Steven specifies that he would like to locate restaurant vouchers for restaurants close to his current location. (If Steven is using a handheld device 25, the system may use the handheld device's GPS functionality to determine Steven's current location.)

The system then displays featured voucher deals from restaurants near Steven's current location for dinner on May 11. Each of these featured vouchers is offered at a fixed price.

Steven decides that he would like to try an Italian restaurant that is close by. Unfortunately, no Italian restaurants are included in the displayed featured deals so he selects a Search Deals button 330 on his smartphone (see FIG. 4). The system then displays a Search Deals screen 800 (see FIG. 10). Steven enters "Italian" in a search criteria box 810 on this screen and then presses a search button 820 to initiate the search. The system then displays a list of nearby Italian restaurants that are offering vouchers. JKL Italian is on this list, and is offering $50 vouchers for bidding. As shown in FIG. 12, Steven bids $30 for a $50 voucher that is good for May 11 at 8:00 pm. Steven also indicates the number of people that will be using the voucher (which my help the restaurant in planning its reservations for the evening).

In the background, the system has set the minimum acceptable bid for this $50 JKL Italian voucher to $25. As a result, because Steven's offer is greater than the minimum acceptable bid for the voucher, the system accepts Steven's bid and allows him to purchase the voucher at his offered price of $30. The system then offers Steven the choice of printing the offer or saving it to the system's memory for later display to JKL Italian on Steven's smartphone.

If Steven's bid had been less than the minimum acceptable bid (in this case $25), the system may have: (1) rejected his bid and given him a chance to re-bid up to a pre-determined number of times; or (2) rejected his bid and provided no chance to re-bid. In either case, once Steven reached the point where he had no more available bids for JKL Italian, in particular embodiments, the system would have locked him out of bidding on JKL Italian offers for a pre-determined period of time (e.g., three days). Steven would still have been able to bid on other restaurants during this time period.

After Steven receives his voucher, he dines at JKL Italian at 8:00 pm on May 11 and uses his voucher to cover the bill. If he does not use the voucher at the specified time period, the voucher will typically expire, or JKL Italian may choose to honor it at another day/time.

B. Dynamic Client Experience

The following example demonstrates the various parties' experiences in an example in which the restaurant has chosen to be a dynamic client.

Restaurant Representative Experience

In various embodiments, if George, the restaurant representative, requests that JKL Italian be designated as a dynamic client, George's experience will be essentially the same as outlined above in regard to the static client experience except that George will be provided with a way to dynamically receive, and respond to, bids from consumers (e.g., substantially in real time). JKL Italian may be provided with a dedicated computer for this purpose. Otherwise, George may access the system via another suitable restaurant computer device, such as a handheld device.

For any bids made by consumers that, as determined by the system, don't meet the specified minimum bid requirements, the system forwards the bid to George's computing device. George may then: (1) accept the bid (e.g., if George anticipates the day/time at issue will be slow); (2) make a counter-offer; or (3) do nothing, in which case the system automatically rejects the bid after a certain period of time and processes the bid as it normally would process a rejected bid for a static client.

Voucher Processing System Experience

The voucher processing system experience in the context of a dynamic client situation is essentially the same as it is in a static client situation, except that, if the system receives a bid that is below the minimum offer for a particular voucher, it forwards the bid for processing by JKL Italian (via George's computing device) as described above. Interaction between JKL Italian and the consumer determines whether the system issues the voucher, unless JKL Italian doesn't respond within a predetermined period of time. In such a situation, the system processes the bid as it would in a static client situation.

Consumer Experience

The consumer experience is essentially the same as above except that, if Steven's bid is below the minimum acceptable bid for the voucher, the system may provide Steven with the opportunity to negotiate directly with JKL Italian instead of having his offer rejected based purely upon pre-set criteria.

CONCLUSION

Many modifications and other embodiments of the invention will come to mind to one skilled in the art to which this invention pertains having the benefit of the teachings presented in the foregoing descriptions and the associated drawings. While examples discussed above cover the use of the system in the context of restaurant-related purchases, the system may be used in any other suitable context. For example, certain systems may be used in the context of other types of venue-specific activities, such as sporting events, classes, movies, or concerts. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A system to transfer restaurant vouchers to users, comprising:
   at least one computer processor; and
   memory, wherein the computer processor executes instructions that are stored in the memory to cause the system to:

receive, from a restaurant, a first set of offer criteria that a consumer's bid must satisfy in order to be deemed adequate compensation for any one of a plurality of restaurant vouchers, each of said plurality of restaurant vouchers being redeemable at said restaurant for the same predetermined amount of goods or services during the same time period, and said first set of offer criteria comprising a first minimum acceptable price, said first minimum acceptable price having a first value that is less than a current menu price of said predetermined amount of goods or services associated with each of the plurality of restaurant vouchers;

receive, from said restaurant, a second set of offer criteria that a consumer's bid must satisfy in order to be deemed adequate compensation for any one of the plurality of restaurant vouchers, said second set of offer criteria comprising a second minimum acceptable price, said second minimum acceptable price having a second value that is less than a value of said predetermined amount of goods or services associated with said one of said particular set of restaurant vouchers;

receive a particular bid from a user to purchase a first one of the plurality of restaurant vouchers;

determine, based on a status of said user, whether to apply said first set of offer criteria or said second set of offer criteria to determine whether said particular bid is adequate compensation for the first one of the plurality of restaurant vouchers, wherein determining whether to apply said first set of offer criteria or said second set of offer criteria comprises determining whether said particular bid has a value that meets or exceeds said first minimum acceptable price and second minimum acceptable price;

in response to determining to apply said first set of offer criteria to determine whether said particular bid is adequate compensation for the first one of the plurality of restaurant vouchers, determine whether said particular bid satisfies said first set of offer criteria;

at least partially in response to determining that said particular bid satisfies said first set of offer criteria, transfer the first one of the plurality of restaurant vouchers to said user;

in response to determining to apply said second set of offer criteria to determine whether said particular bid is adequate compensation for the first one of the plurality of restaurant vouchers, determine whether said particular bid satisfies said second set of offer criteria; and at least partially in response to determining that said particular bid satisfies said second set of offer criteria, transfer the first one of the plurality of restaurant vouchers to said user.

2. The system of claim 1, wherein said status of said user has been derived, based at least in part, on a number of previous voucher purchases made by said user through said the system.

3. The system of claim 1, wherein:
each of said plurality of restaurant vouchers is only redeemable during a particular time window on a particular day, said particular time window comprising a traditional meal time on said particular day.

4. The system of claim 3, wherein said particular time window is less than about seven hours in length.

5. The system of claim 1, wherein the computer processor further executes instructions that are stored in the memory to cause the system to:
at least partially in response to determining that said particular bid does not satisfy said first set of offer criteria, forward said particular bid to said restaurant for consideration.

6. The system of claim 1, wherein the computer processor further executes instructions that are stored in the memory to cause the system to:
at least partially in response to determining that said particular bid does not satisfy said first set of offer criteria, facilitate negotiations between said user and said restaurant for the first one of the plurality of restaurant vouchers.

7. The system of claim 1, wherein the computer processor executes instructions that are stored in the memory to cause the system to:
at least partially in response to forwarding said particular bid to said restaurant for consideration, enable a designated representative of said restaurant to select at least a first option and a second option, wherein:
said first option comprises approving said particular offer; and
said second option comprises making a counteroffer for said restaurant voucher;
receive, from said designated representative a selection of said first option or said second option;
at least partially in response to receiving said selection of said first option, transfer said one of said first set of restaurant vouchers to said user; and
at least partially in response to receiving said selection of said second option, provide said counteroffer for said one of said first set of restaurant vouchers to said user.

8. The system of claim 1, wherein the computer processor executes instructions that are stored in the memory to cause the system to:
at least partially in response to forwarding said particular bid to said restaurant for consideration, enable a designated representative of said restaurant to select at least a first option and a second option, wherein:
said first option comprises approving said particular offer; and
said second option comprises making a counteroffer for said restaurant voucher;
receive, from said designated representative a selection of said first option or said second option;
at least partially in response to receiving said selection of said first option, transfer said one of said first set of restaurant vouchers to said user; and
at least partially in response to receiving said selection of said second option, provide said counteroffer for said one of said first set of restaurant vouchers to said user.

* * * * *